3,725,014
Patented Apr. 3, 1973

3,725,014
SODIUM CARBONATE CRYSTALLIZATION PROCESS WITH FOAM PREVENTION
Rustom Pestonji Poncha, Camillus, Norman Rutledge Garofano, Geddes, and Alan Brian Gancy, Syracuse, N.Y., assignors to Allied Chemical Corporation, New York, N.Y.
No Drawing. Filed Apr. 21, 1971, Ser. No. 136,182
Int. Cl. B01d 9/02; C01d 7/24
U.S. Cl. 23—300  20 Claims

ABSTRACT OF THE DISCLOSURE

Invention relates to the preparation of sodium carbonate precursor crystals, such as sodium bicarbonate, sodium sesquicarbonate, anhydrous sodium carbonate, and sodium carbonate monohydrate by a crystallization process which involves crystallizing said precursor crystals from a carbonate process solution in the presence of an antifoaming effective amount of a cationic surface active agent and separating the crystals formed from the mother liquor.

BACKGROUND OF INVENTION

Trona, as found in the Green River area of Wyoming consists mainly of sodium sesquicarbonate $$(Na_2CO_3 \cdot NaHCO_3 \cdot 2H_2O)$$

A typical analysis of trona contains:

| Constituent: | Percent |
|---|---|
| $Na_2CO_3$ | 45 |
| $NaHCO_3$ | 36 |
| $H_2O$ | 15.30 |
| $NaCl$ | 0.04 |
| $Na_2SO_4$ | 0.01 |
| $Fe_2O_3$ | 0.14 |
| Organic matter | 0.30 |
| Insolubles | 3.20 |

In addition to a water-insoluble fraction resulting from the association of the trona with shale stringers or beds in the trona deposits, organic matter in the order of about 0.3% is present which would contaminate the desired product, e.g. sodium carbonate precursor crystals, unless it is removed. It is believed that the organic matter in the trona consists of kerogenaceous material containing monocarboxylic acids, dicarboxylic acids, certain unsaturated acids, steroids and certain rosin acids.

Various methods previously have been proposed to reduce the organics to an acceptable level so as not to adversely affect the crystal quality. For instance, in U.S. Pats. Nos. 2,962,348 and 3,131,996 the crude trona is decarbonized at relatively high temperatures. These patents disclose that at temperatures in the order of about 400° C. to about 800° C., the organic matter present in the crude trona is substantially removed as it is converted to a less soluble state where it is removed in the subsequent steps of dissolving, clarifying and filtration prior to the crystallization. This method, of course, would involve a high heat requirement, thus increasing the cost of the ultimate product. Also, heating the trona in excess of 400° C., while eliminating substantial amounts of the carbon in the crude trona, substantially increases the quantity of water-soluble silica in the crude sodium carbonate, the removal of which is difficult, requiring the bleeding off of substantial amounts of the mother liquir separated from crystallizers. This results in a loss of valuable carbonate values in the discarded mother liquor.

Another method proposed is that described in U.S. Pat. No. 3,028,215, wherein the sodium carbonate precursor crystals containing organic impurities are subjected to a high temperature calcination, i.e. temperature in the order of about 400° C. to about 800° C., wherein the organic impurities are either volatilized or converted to a coke which allegedly does not present any problem in the utilization of the resulting soda ash in commerce. However, the crystal quality is not significantly improved because the organics are present during crystallization at which time their adverse affect is realized on the quality of the crystal produced during the crystallization. Also, the equipment and heat requirements to calcine the contaminated sodium carbonate precursor crystals are significant, particularly when the production rate is in the magnitude of more than 1000 tons of product per day.

Still another method for reducing organics is that described in U.S. Pat. 3,260,567, wherein the crude trona is first converted to crude sodium carbonate at relatively low temperatures, i.e. in the order of about 150° C. to 200° C., and then the crude sodium carbonate is dissolved in an aqueous solution. After removal of the insolubles by clarification, the organics are substantially reduced by passing the solution of crude sodium carbonate through a bed of adsorbent, such as activated carbon, prior to crystallization. After crystallization the mother liquors are recycled through the adsorbent beds to reduce the buildup of the organics in the mother liquor stream prior to a second crystallization. While there is little, if any, necessity to bleed off any mother liquor due to organics building up in the recycled mother liquor, special equipment is necessary to reactivate the large amounts of the activated carbon when it no longer effectively performs its function. Also, there is needed to effect this operation an increase in the necessary processing equipment due to the large volumes of liquid, i.e. fresh feed solution as well as recycled mother liquor, to be handled. It is estimated that to handle this recycled mother liquor the number of carbon towers would be in the order of approximately twice that needed to handle the increased volume.

In addition to the use of an adsorbent, it is customary to add to the solution to be crystallized organic anionic surface active agents, such as alkylated benzene sulfonate, as crystallization modifiers to improve the desired physical properties of the sodium carbonate precursor crystals. Likewise, added to the solution are organic defoaming agents, such as castor oil, and other organic impurities picked up in the circulating liquors in the plant are present in the solution prior to and during crystallization. The presence of these organics to any appreciable extent is not desired because they adversely affect crystal quality, e.g., discoloration of the crystals and reduction in bulk density, which may limit the extent of use of the precursor crystals, particularly if they are to be converted to dense soda ash for use in the glass industry.

In general, however, the reduction of soluble organic impurities through the use of an adsorbent and the use of defoaming agent have been found required for the successful economic production of sodium carbonate precursor crystals when vacuum evaporation systems are employed.

Notwithstanding these elaborate processing techniques which all involve a substantial cost in capital equipment and consumption of time, the effectiveness of the removal of organic matter is reduced, particularly when the trona ore quality is poor or processing upsets occur, when the carbonate process solution has objectionable and non-adsorbable organic impurities and resort must be made to the use of the aforementioned organic-containing crystal modifiers. It has been found that as much as 55 to 75% of the initial organic impurity content of the carbonate process solution after treatment with an adsorbent, such as activated carbon, still are retained in the carbonate solution going to the crystallizers.

As noted above, it has been the practice to add defoaming agents such as castor oil to reduce the foam during evaporative crystallization. The presence of foam during crystallization has long been a recognized problem and its presence has been attributed to certain species of soluble organic impurities attributable to the kerogenaceous material found associated with the naturally occurring carbonate-containing mineral deposits, such as trona. The presence of these foam-causing organic species in the carbonate process solution subjected to evaporative crystalliation causes operating difficulties and economic penalties, such as reduction of equipment capacity and the loss of soda liquor values by excessive foaming.

While it generally has been known to use cationic surface active agents to determine analytically, by titration, the concentration of anionic detergents in solution, the use of cationic surface active agents as anti-foaming agents in carbonate process solutions is unexpected because they have been found to suppress foam over a wide range of sodium carbonate and/or sodium bicarbonate concentrations and surface active agent concentrations.

It has now been found that the prior art problem concerning the presence of organic impurities in a carbonate process solution has been substantially obviated by the discovery of adding to the sodium carbonate process solution an anti-foaming effective amount of a cationic surface active agent. As a result of the presence of the cationic surface active agent during crystallization the foam normally occurring can be substantially eliminated and the granulation of the resulting precursor crystals has been found improved by reducing the quantity of undesirable plus 40 mesh, thus reducing the recycle load of the commercial plant. Also, the use of the cationic surface active agent permits, if desired, the avoidance of the use of an adsorbent treatment step for the carbonate process solution to remove the adsorbable organic impurities, since when such adsorbent treatment is bypassed the organic impurity level in the soda ash product has not been found to have been appreciably increased over that when they were in use. A still further improvement in the use of the preferred cationic surface active agents, organic quaternary ammonium compounds, described more fully hereinbelow, is the removal, if desired, of organic coloring matter from the carbonate process solution which has not previously been subjected to treatment with an adsorbent.

The cationic surface active agents which have been found as effective anti-foaming agents in the crystallization of carbonate process solutions are those classified "cationic" as found in J. W. McCutcheon's annual publications, "Detergents and Emulsifiers," for instance, 1970 Annual (published by Allured Publishing Corporation, 45 N. Brand St., Ridgewood, N.J.), which disclosure is herein specifically incorporated by reference. Typical of the suitable cationic surface active agents for the present invention are the organic nitrogen-containing compounds and their salts and include the amines (primary, secondary and tertiary), amides, hetrocyclic nitrogen compounds and the quaternary ammonium compounds; sulfonium compounds and their salts and phosphonium compounds and their salts. The preferred class of cationic agents are the nitrogen-containing compounds and of those the amines and quaternary ammonium compounds and corresponding salts. The preferred amines and quaternary compounds are those having a formula weight from about 75 up to about 500, with formula weights from 130 up to 450 being especially preferred, basis cationic radical of active material. The especially preferred anti-foaming cationic surface agents in the carbonate process solution are the quarternary ammonium compounds.

Representative cationic organic amines and amine salts are the primary, secondary, and tertiary alkyl and aryl amines; acid salts of the alkyl amines (e.g. acetic and fatty acid salts, such as N-tallow trimethylene diamine diacetate); amines containing both alkyl and aryl radicals attached to or coordinated with the central nitrogen atom and the corresponding hydrohalide salts. Exemplary of suitable amines include the primary, secondary and tertiary organic amines, such as the octyl-, dioctyl- and trioctylamines and their hydrochlorides; and the alkyl polyoxyethylene- and -glycol amines.

Representative quaternary ammonium compounds and their salts include tetrahexyl ammonium bromide, cetyl dimethyl benzyl ammonium chloride, cetyl trimethyl ammonium bromide, cetyl trimethyl ammonium stearate, dodecyl trimethyl ammonium chloride, octadecenyl-9 dimethyl benzyl ammonium chloride, alkyl dimethyl dichlorobenzyl ammonium chloride, lauryl dimethylbenzyl dimethyl ammonium chloride, diisobutyl phenoxy ethoxy ethyl dimethyl benzyl ammonium chloride monohydrate.

Representative amides include alkylolamides (lauric alkylolamide and oleic alkylolamide) fatty acid amides and substituted amides of alkyl phosphate.

Representative organic heterocyclic nitrogen compounds and their salts include the alkyl and substituted oxazolines, hetrocyclic tertiary amines, cetyl pyridinium bromide and chloride, lauryl isoquinolinium bromide, lauroyl imadazolene hydroxy-acetate and carbonate, fatty imidazoline.

A representative organic, sulfonium compound is dodecyl ethyl methyl sulfonium chloride, a trialkylsulfonium halide.

Representative phosphonium compounds include the alkyl phosphonium halides, such as triethoxy butyl phosphonium bromide.

The amount of cationic surface active agent which may be added to the carbonate process solution to effect antifoaming generally is no more than about 250 parts per million (p.p.m.) active material, basis sodium carbonate, with a concentration within the range of about 1 to 150 being preferred, with 1–60 p.p.m. being especially preferred. While levels below 1 p.p.m. exhibit beneficial effect, such effect is of reduced magnitude. Accordingly, the broad range of 1–250 p.p.m. may be employed. Similarly, amounts in excess of 250 p.p.m. may be used with beneficial results, but complicated effects may begin to appear at excessively high levels, such as adverse changes in the crystal habit of the desired sodium carbonate precursor crystal obtained in the crystallization, and organic contamination of the precursor crystals and therefore the final product, by the use of higher concentrations of the cationic surface active agent. Also, at the higher concentrations there is an economic penalty due to the additional cost involved in the use of these additives. Generally, commercially available cationic surface active agents are sold in the form of solutions and the above indicated concentration levels refer to the active content of these various commercial surface active compositions available.

The cationic surface active agents available have been found effective anti-foaming agents at the temperatures employed during the crystallization of the carbonate process solution to obtain the desired sodium carbonate precursor crystal. These additives prevent foaming during the evaporative crystallization at temperatures from about 25° C. up to about 109° C. The effectiveness of the anti-foaming agents are substantially equivalent over the temperature range noted above.

By the phrase "carbonate process solution," as herein used, refers to aqueous solutions containing at least one of sodium carbonate and/or bicarbonate from which solution crystals of sodium bicarbonate, sodium sesquicarbonate, anhydrous sodium carbonate and sodium carbonate monohydrate, can be obtained as the stable crystal phase and can be recovered from mother liquor. The carbonate process solution is preferably derived from trona, but may also be derived from other natural minerals such as nahcolite ($NaHCO_3$), thermonatrite ($Na_2CO_3 \cdot H_2O$), natron ($Na_2CO_3 \cdot 10H_2O$), and dawsonite (NaAlCO$_3$(OH)$_2$), particularly when these minerals are associated with or near kerogen type deposits. The carbonate process solutions derived from these minerals, including trona, contain varying proportions of sodium carbonate and sodium bicarbonate together with soluble organic impurities. The carbonate process solution may be prepared, as described hereinbelow, by various procedures and contains about 10 to 1,000, preferably about 10 to 500 parts per million organic carbon, calculated on a sodium carbonate basis. While the carbonate process solution is preferably substantially saturated with respect to sodium carbonate and/or sodium bicarbonate values, it has been found that the concentration of the carbonate process solution to which the cationic surface active agent is added in anti-foaming effective amounts can vary. For instance, concentrations of the carbonate process solution equivalent to at least about 12% by weight equivalent sodium carbonate content have been observed to be required for the cationic surfactants to exhibit anti-foaming properties. However, in view of the extra load on evaporation equipment when less than substantially saturated process solutions are treated, the cationic surface active agents are effective as anti-foamers for all commercially practical carbonate process solutions from which sodium carbonate precursor crystals are produced.

In typical trona processing operations carbonate process solution which has been clarified and filtered is passed in series through crystallization units, typically "multiple effect" evaporator crystallizers. In general, three crystallizers or effects of known design are fed the carbonate process solution and the feed passes through the crystallizers in a chosen direction, generally first to the crystallizer operated at the highest temperature (first effect) then to the next crystallizer operated at a temperature lower than that in the first effect crystallizer. The "effects" are numbered in the direction of steam flow. As the carbonate process solution passes through the crystallizers a slurry of sodium carbonate precursor crystals is formed and passed to each succeeding crystallizer. The slurry is passed from one effect to the other in the chosen direction by a series of pumps. From the last effect the slurry, containing about 15 to 60%, preferably about 30 to 50%, solids is allowed to settle. The sodium carbonate precursor crystals are separated and the mother liquor separated from the sodium carbonate precursor crystals is combined with the freshly filtered carbonate process solution which is to be fed to the crystallizers to effect crystallization of a second crop of precursor crystals. Exemplary of the aforementioned prior art crystallization procedures for the processing of carbonate process solutions may be found in the disclosures of U.S. Pats. Nos. 2,704,239 (crystallization of sodium carbonate); 2,770,524 (crystallization of anhydrous sodium carbonate); 2,639,217 and 3,028,215 (crystallization of sodium sesquicarbonate); and 2,343,080, 2,343,081, 2,962,348, 3,131,996 and 3,260,567 (crystallization of sodium carbonate monohydrate).

In each one of these prior art processes, the carbonate process solution generally first enters the crystallizer operated at highest temperature (first effect) and passes in series in the form of a slurry through the crystallizers, each succeeding one being operated at a lower temperature than the previous one. In the event the solids content of the slurry which is being pumped through the crystallization unit becomes too thick or viscous a portion of the slurry may be withdrawn and passed to a crystal separator. The slurry, after removal from the last of the multiple effect crystallizers, is separated into the sodium carbonate precursor crystals and the mother liquor, for instance by a centrifuge. The crystals are either dried and stored or passed to a dryer or calciner and converted to soda ash. The mother liquor is then recycled to the system passing through the first effect evaporator crystallizer together with clarified and filtered carbonate process solution not previously treated in the crystallizer. In some processes a portion of the mother liquor is sent to dissolve additional trona.

In the preferred embodiment of the present invention the carbonate process solution which has been clarified and filtered is first fed for crystallization to the crystallizer(s) operated at the lower temperatures, e.g. the second and third effects of a multiple effect evaporator system, and the mother liquor separated from the sodium carbonate precursor crystals is then used as a feed liquor to the crystallizer(s) operated at the highest temperature, e.g. first effect. Thus, for any level of organic impurity in the crystallizer feed liquor, whether carbonate process solution or recycled mother liquor, crystal quality has been found best from the crystallizer operated at the highest crystallizing temperature. Thus, the adverse effect on the sodium carbonate precursor crystal quality prepared from the feed containing the higher organic content, i.e. recycled mother liquor, would be minimized. Such a procedure is described more fully in copending application S.N. 757,511, filed Sept. 4, 1968, now U.S. Pat. No. 3,653,848, which disclosure is incorporated herein by reference.

The carbonate process solution may be subjected to crystallization in any of the well-known types of evaporative crystallizers commonly employed. Preferably, however, for purposes of economy, it is preferred in the operation of the present invention to employ as the crystallization system three evaporative crystallizers. However, it is possible to practice the present invention employing a greater or lesser number of crystallizers, the choice being one of economy.

The cationic surface active agent is preferably added to the carbonate process solution in anti-foaming effective amounts just prior to the passing of the solution to the crystallizers wherein the precursor crystals are prepared.

Foam index test method

In the following examples which demonstrate the process of the present invention as empirical volumetric method was employed to measure the absolute magnitude of the foam generated in the carbonate process solution and the resultant measurement was termed the "Foam Index" of the solution. In this method foam was generated by passing air, containing water vapor, through a medium glass frit submerged in 300 milliliters of the carbonate process solution maintained at 45±5° C. in a 500-milliliter graduated cylinder at a constant air flow rate of about 1075 cubic centimeters per minute, metered at 14.7 p.s.i.a. at 21° C. The foam generated above the liquor is immediately titrated with a methanol solution comprising 100 p.p.m. of a commercially available water-insoluble defoaming agent dissolved in pure methyl alcohol. The methanol solution is added in successively decreasing increments and the endpoint is defined as the volume of titrant beyond which additional increments do not appreciably further decrease the foam of the process solution. The Foam Index represents the number of milliliters of this standard solution, required to eliminate the foam of 300 milliliters of process solution at 45±5° C. when sparged with air containing water vapor flowing at a rate of 1,075 cubic centimeters per minute metered at 14.7 p.s.i.a. at 21° C. In general, Foam Index values for clarified-filtered carbonate process solution prepared from trona ore calcined at temperatures between about 140° C. and 200° C., but not treated with an activated carbon adsorbent have been found to be in the range of 20 to 40.

Quantitative test method

In order to evaluate quantitatively the effectiveness of the cationic anti-foaming agent a test method was devised by which the "minimum" quantity of anti-foam required to essentially eliminate the foam of a carbonate process solution was determined. In this method, 100 milliliters of clarified-filtered carbonate process solution, not treated with activated carbon adsorbent, was placed in a 250 milliliter gas washing bottle with a coarse glass frit. Small increments, usually about 0.1 milliliters, of the cationic anti-foaming agent was added generally as a dilute solution or aqueous suspension at a concentration of about 0.05% weight. The mixture was maintained at a temperature of 45±5° C. and sparged with air, containing water vapor, at a constant air flow rate and the concentration of cationic anti-foaming agent found to essentially prevent a foam height of less than about 1-centimeter height was recorded as the minimum concentration of anti-foamer required, basis contained equivalent sodium carbonate in the solution. The results of the various anti-foamers tested were reported as parts per million (p.p.m.), basis contained equivalent sodium carbonate. Without the addition of the cationic anti-foaming agent, sparging humidified air through a carbonate process solution would yield a foam volume of infinite height and therefore could not be directly measurable by this second test method.

EXAMPLE 1

A clarified-filtered saturated solution of crude sodium carbonate (30% $Na_2CO_3$) was prepared by dissolving calcined trona ore, calcined at about 150° C. and containing about 10% weight insoluble matter, in 80° C. water and after agitation and settling of the solution separating the insoluble portion by decanting and filtering the supernatant liquor. The Foam Index of the carbonate process solution was 30, as determined by the method described hereinabove. The minimum concentration of certain cationic primary, secondary and tertiary amines required to essentially suppress foaming of the carbonate process solution when sparged with humidified air at a constant air flow rate of 230 cubic centimeters per minute in accordance with the Quantitative Test Method described hereinabove are as shown by the data in Table I, below.

TABLE I

| Amine | Type amine | Formula weight | Quantitative test method, p.p.m.[1] |
|---|---|---|---|
| Octylamine hydrochloride | Primary | 129 | 65 |
| Dioctylamine hydrochloride | Secondary | 241 | 13.3 |
| Trioctylamine hydrochloride | Tertiary | 353 | 151 |

[1] Parts per million of the amine, basis contained equivalent sodium carbonate in the carbonate process solution, required to reduce the foam to 1-centimeter height or less with an air flow rate of 230 cc./min.

EXAMPLE 2

A clarified-filtered process liquor of saturated crude sodium carbonate was prepared in accordance with the procedure of Example I. The Foam Index of the resultant carbonate process solution was 26. The minimum concentration of primary amine required to essentially prevent foaming in the carbonate process solution when sparged with humidified air at a constant air flow rate of 1075 cubic centimetes per minute was determined. The anti-foaming action of certain primary amines was determined by the Quantitative Test Method and the results obtained are recorded in Table II below.

TABLE II

| Primary amine hydrochloride | Amine | Formula weight | Quantitative test method, p.p.m.[1] |
|---|---|---|---|
| Butylamine hydrochloride | $C_4H_9NH_2$ | 73 | >75 |
| Hexylamine hydrochloride | $C_6H_{13}NH_2$ | 101 | >75 |
| Octylamine hydrochloride | $C_8H_{17}NH_2$ | 129 | 40 |
| Dodecylamine hydrochloride | $C_{12}H_{25}NH_2$ | 185 | 40 |
| Octadecylamine hydrochloride | $C_{18}H_{37}NH_2$ | 269 | 26 |

[1] Parts per million of the amine, basis contained equivalent sodium carbonate in the carbonate process solution, required to reduce the foam to 1-centimeter height or less with an air flow rate of 1,075 cc./min.

As may be seen from the data of Table II, the amines having a formula weight of less than about 100 are not as effective anti-foaming agents as the amines of a formula weight greater than about 130.

EXAMPLE 3

A clarified-filtered carbonate process solution of saturated crude sodium carbonate (30% $Na_2CO_3$) was prepared in accordance with the procedure of Example 1. The Foam Index of the resultant carbonate process solution was 29. The minimum concentration of organic quaternary ammonium ion radical required to essentially prevent foaming in the carbonate process solution when sparged with humidified air at a constant air flow rate of 1,075 cc./min. was determined by the Quantitative Test Method and the results obtained are recorded in Table III, below.

TABLE III

| Quaternary ammonium compound | Organic ammonium ion Radical | Formula wt. | Quantitative test method p.p.m.[1] |
|---|---|---|---|
| Trimethyl phenyl ammonium bromide. | $C_9H_{14}N^+$ | 136 | >81 |
| Tetrapropyl ammonium bromide. | $C_{12}H_{28}N^+$ | 186 | >43 |
| Nonyl trimethyl ammonium bromide. | $C_{12}H_{28}N^+$ | 186 | 9 |
| Tetrabutyl ammonium bromide. | $C_{16}H_{36}N^+$ | 242 | 24 |
| Tetrapentyl ammonium bromide. | $C_{20}H_{44}N^+$ | 298 | 22 |
| Tetrahexyl ammonium bromide. | $C_{24}H_{52}N^+$ | 354 | 16 |
| Stearyl dimethyl benzyl ammonium chloride. | ca $C_{27}H_{50}N^+$ | ca 388 | 2.4 |
| Trioctyl propyl ammonium bromide. | $C_{27}H_{58}N^+$ | 396 | 22 |
| Di-isobutyl phenoxy ethoxy ethyl dimethyl benzyl ammonium chloride. | $C_{27}H_{42}O_2N^+$ | 412 | 22 |
| Tetraheptyl ammonium bromide. | $C_{28}H_{60}N^+$ | 410 | 40 |

[1] Parts per million of the amine, basis contained equivalent sodium carbonate in the carbonate process solution, required to reduce the foam to 1-centimeter height or less with an air flow rate of 1,075 cc./min.

From the data in Table III it may be seen that compounds containing organic quaternary ammonium ion radicals of a formula weight greater than about 130 are effective anti-foaming agents.

EXAMPLE 4

The anti-foaming effectiveness of a variety of commercially available cationic-active surfactants in a carbonate process solution derived from trona and prepared according to the procedure of Example 1 is demonstrated by the data appearing in Table IV, below. The carbonate process solution had a Foam Index of 22. The minimum concentration of active species of the commercially available cationic surfactant which essentially prevented foam of 1-centimeter height by sparging humidified air at a constant flow rate of 1,075 cc./min. through the solution was determined by the Quantitative Test Method described above.

TABLE IV

| Manufacturer | Commercial trade name/ (Active species) | Quantitative test method, p.p.m. |
|---|---|---|
| Armour Ind. Chem. Co. | Arquad 12-50/(n-Alkyl trimethyl ammonium chloride). | 8 |
| Do. | Arquad S-50/(n-Alkyl trimethyl ammonium chloride). | 9 |
| Do. | Arquad T-50/(n-Alkyl trimethyl ammonium chloride). | 64 |
| Do. | Arquad 2C-75/(Di-coco dimethyl ammonium chloride). | 6 |
| Do. | Arquad 2S-75/(Di-soya dimethyl ammonium chloride). | 2 |
| Do. | Arquad 2HT-75/(Di-stearyl dimethyl ammonium chloride). | 6 |
| Do. | Arquad 18-50/(n-Alkyl trimethyl ammonium chloride). | 8 |

TABLE IV—Continued

| Manufacturer | Commercial trade name/ (Active species) | Quantitative test method, p.p.m. |
|---|---|---|
| Rohm & Haas | Hyamine 10X/(Di-isobutyl cresoxy ethoxy ethyl dimethyl benzyl ammonium chloride). | 13 |
| Do | Hyamine 2389/(methyl dodecyl benzyl trimethyl ammonium chloride and methyl dodecyl xylene bis (trimethylammonium chloride)). | 8 |
| Do | Hyamine 3500/(N-alkyl ($C_{12}$, $C_{14}$, $C_{16}$) dimethyl benzyl ammonium chloride). | 5 |
| Do | Hyamine 1622/(Di-isobutyl phenoxy ethoxy ethyl dimethyl benzyl ammonium chloride). | 13 |
| Do | Triton X-400/(Stearyl dimethyl benzyl ammonium chloride and related cationics. | 1-2 |
| Armour Ind. Chem. Co. | Duomac T/(N-tallow trimethylene diamine diacetate). | 42 |
| Aceto Chem. Co., Inc. | Acetoquat CPB/(Cetyl pyridinium bromide). | 29 |
| Eastman Distillation Products Ind. | Dodecyl ethyl methyl sulfonium chloride. | 25 |

As may be seen from the data in Table IV commercially available cationic surface active agents of the class of organic quaternary ammonium compounds, organic heterocyclic nitrogen compounds and organic sulfonium compounds, are effective materials for the prevention of foam in trona-derived carbonate process solution.

EXAMPLE 5

The effectiveness of both the anti-foaming action and reduction of color in the carbonate process solution is demonstrated by this example. The foam height of a 400 gm. sample of a carbonate process solution containing 25% by weight sodium carbonate, prepared according to the method described in Example 1, was obtained by sparging the solution with humidified air at an air flow rate of 190 cc./min. The maximum height attained by the foam was measured. The color of the solution was determined by measuring the percent adsorption of a sample of the solution in a 50-millimeter Vycor cell at a wavelength of 400 millimicrons. To the carbonate process solution exact increments of a 1.0% by weight solution of the commercially available cationic organic quaternary ammonium compound, Hyamine 1622, was added to the solution at room temperature (about 25° C.). The foam height of the resultant solution was measured and the solution filtered. The color of the solution was again determined by the above procedure. The foam height measurement and colormetric determination were again repeated after adding additional increments of the cationic surface active agent. The results obtained are reported in Table V.

TABLE V

| Cationic quaternary ammonium solution (ml.) | Foam height (cm.) | Percent foam reduction (percent) | Liquor color (percent abs.) | Percent color reduction (percent) | Cumulative amount of cationic additive (p.p.m. basis $Na_2CO_3$) |
|---|---|---|---|---|---|
| 0.0 | 12.0 | 0 | 73 | 0 | 0 |
| 0.2 | 10.0 | 16.7 | 65 | 11.0 | 20 |
| 0.2 | 3.0 | 75.0 | 64 | 12.3 | 40 |
| 0.2 | 3.0 | 75.0 | 58 | 20.6 | 60 |
| 0.4 | 2.0 | 83.4 | 55 | 24.6 | 100 |
| 0.5 | 1.0 | 91.8 | 51 | 30.2 | 150 |
| 1.0 | 1.0 | 91.8 | 46 | 37.0 | 250 |
| 2.0 | 1.0 | 91.8 | 40 | 45.2 | 450 |

As may be seen from these data, the cationic quaternary ammonium compound exhibits both anti-foaming and decoloring properties when added to a carbonate process solution. When desired, decolorization of the carbonate process solution can be accomplished by the addition to the solution of the quaternary ammonium compounds in concentrations up to about 500 p.p.m.

EXAMPLE 6

This example demonstrates the anti-foaming properties of the cationic quaternary ammonium compound Hyamine 1622 for a carbonate process solution containing both sodium carbonate and sodium bicarbonate, i.e. sodium sesquicarbonate.

(A) Green River raw trona was used for preparing the carbonate process solution containing 7.25% $NaHCO_3$ and 9.87% $Na_2CO_3$. 100 ml. (116 gm.) of this solution was sparged with humidified air at a flow rate of 1075 cc./minute. To prevent foaming 0.4 ml. of a 0.1% solution of Hyamine 1622 was added which corresponds to 3.5 p.p.m. basis sodium sesquicarbonate liquor.

(B) In another experiment a carbonate process solution containing 25% by sodium carbonate was prepared as above from Green River calcined trona. The solution was carbonated with $CO_2$ at 50–60° C. and the resultant liquor contained 8.25% $NaHCO_3$ and 12.20% $Na_2CO_3$. 100 ml. (110 gm.) of this solution was sparged with humidifier air at a flow rate of 1,075 cc./minute. To prevent foaming 0.1 ml. of a 0.1% solution of Hyamine 1622 was added, which corresponds to 1.0 p.p.m., basis carbonate liquor. 100 ml. (118 gm.) of the uncarbonated carbonate solution containing 25% $Na_2CO_3$ required 0.4 ml. of the 0.1% additive for foam control which corresponds to 3.4 p.p.m., basis carbonate liquor

EXAMPLE 7

This example demonstrates the effectiveness of the cationic surface active agents in improving the granulation of sodium carbonate precursor crystals by reducing the quantity of less desirable plus 40 mesh precursor crystals formed during evaporative crystallization of a carbonate process solution. A series of screenings were made on the final bed of the precursor sodium carbonate monohydrate crystals generated in a crystallizer after 12 hours of continuous operation wherein 150 parts per million of trioctyl amine hydrochloride, basis contained sodium carbonate, was added to a saturated, clarified-filtered, calcined trona-derived carbonate process solution prepared as described in Example 1. The carbonate process solution, containing approximately 29% to 30% sodium carbonate and the cationic surface active agent, was subjected to a vacuum evaporation at approximately 9 inches of mercury and at a temperature of about 95° C. The carbonate process solution was fed to the crystallizer at a rate of about 1 kilogram of solution per hour while continuously withdrawing condensate from the evaporator in proportion to the process liquor feed rate. Also, slurry samples of the monohydrate crystals produced were periodically withdrawn at a rate sufficient to maintain the slurry density of the crystallizer system at a nearly constant value of approximately 45% by weight monohydrate crystals. The crystallization operation was terminated after 12 hours and the final crystallizer bed crystals were separated from the supernatant liquor by vacuum filtration, washed with alcohol and air dried prior to screening.

The effects of 150 p.p.m. of octyl amine hydrochloride, a primary amine, under the same crystallizing conditions were also investigated. For comparative purposes these data together with the data obtained from a crystallization without the presence of a cationic surface active agent are presented in Table VI, following:

TABLE VI

| | Screen analysis of monohydrate bed crystals, percent | | | | | |
|---|---|---|---|---|---|---|
| | Without amine additives | | With 150 p.p.m. $C_8H_{17}NH_2 \cdot HCl$, basis sodium carbonate | | With 150 p.p.m. $(C_9H_{17})_3N \cdot HCl$, basis sodium carbonate | |
| U.S. mesh | Retained on | Cumulative | Retained on | Cumulative | Retained on | Cumulative |
| +20 | 0.88 | 0.88 | 0.33 | 0.33 | 0.24 | 0.24 |
| +30 | 28.59 | 29.47 | 2.80 | 3.13 | 1.30 | 1.54 |
| +40 | 42.42 | 71.89 | 19.20 | 22.33 | 8.60 | 10.14 |
| +50 | 15.72 | 87.61 | 50.16 | 72.49 | 38.76 | 48.90 |
| +70 | 8.68 | 92.29 | 21.73 | 94.22 | 37.38 | 86.28 |
| +100 | 2.52 | 98.81 | 3.80 | 98.02 | 9.36 | 95.64 |
| +140 | 0.56 | 99.37 | 0.96 | 98.98 | 2.52 | 98.16 |
| +200 | 0.16 | 99.53 | 0.34 | 99.32 | 0.83 | 98.99 |
| +270 | 0.13 | 99.66 | 0.21 | 99.53 | 0.45 | 99.44 |
| −270 | 0.34 | 100.00 | 0.47 | 100.00 | 0.56 | 100.0 |

As seen from the data to Table VI, the quantity of plus 40-mesh crystals is significantly reduced from about 72% cumulative to only about 10% and 22% cumulative on a 40-mesh screen as the result of the addition of 150 p.p.m. of the amine hydrochlorides to the carbonate process solution. Furthermore; the quantity of very fine crystals—that quantity of crystals smaller than 200-mesh—is not significantly increased as the result of addition of the amine hydrochlorides. The reduction of the quantity of plus 40 mesh monohydrate crystals would significantly reduce the amount of screening and oversize product recycle associated with the commercial production of sodium carbonate from precursor monohydrate crystals wherein the granulation of the final soda ash product was desired to match as close as possible that of the glass sand granulation commonly employed for glass batch preparation. Glass sands of the mid-western region normally contain less than about 10% as plus 40 mesh sand particles and about 98% to 99% cumulative on a 200-mesh screen. Through the reduction of the quantity of less desirable oversize material the productive capacity of a commercial soda ash plant can be significantly increased thereby providing improved economy of plant operation.

EXAMPLE 8

This example demonstrates the beneficial effects of the use of di-isobutyl phenoxy ethoxy ethyl dimethyl benzyl ammonium chloride, a cationic, organic, quaternary ammonium chloride sold under the tradename Hyamine 1622, as an anti-foaming agent for the continuous production of soda ash in a commercial operation.

Trona ore which had been dry mined and crushed to approximately ¼-inch size, containing approximately 85–90% sodium sesquicarbonate, is heated at elevated temperatures ranging from about 150° C. to about 500° C., converting the sesquicarbonate values in the trona ore to crude sodium carbonate. The crude sodium carbonate is then dissolved in an aqueous solution forming a carbonate process solution containing approximately 28% to 30% sodium carbonate. The carbonate process solution containing undissolved grit and mud is passed through a clarification system to remove insoluble solids, such as shale and dirt, and is drawn off as thickened muds from the system, Flocculents may be added to the carbonate process solution to assist in the coagulation and settling of such solids. The clarified liquor is then filtered without the aid of adsorbents commonly employed to reduce organic impurities, such as activated carbon. A concentrated aqueous solution containing 50% by weight of the active ingredient contained in above referred to surface active agent is continuously metered into the carbonate process solution to provide about 25 parts per million active ingredient, basis contained sodium carbonate in the carbonate process solution. The carbonate process solution is fed in parallel to the second and third effects, with respect to steam, of a multiple-effect vacuum evaporation crystallization system operated under conditions, including temperatures of 60°–90° C., to form a slurry of sodium carbonate monohydrate. The sodium carbonate monohydrate slurry containing approximately 40% solids is removed and the crystals of sodium carbonate mono-hydrate separated from the mother liquor. The mother liquor is subjected to crystallization conditions for the production of a second crop of sodium carbonate precursor crystals, including temperatures of 90°–109° C., to form a slurry of sodium carbonate monohydrate. This sodium carbonate monohydrate slurry containing approximately 40% solids is removed and the crystals of sodium carbonate monohydrate separated from the mother liquor.

The separated mother liquor is recycled to the higher temperature crystallization effect while purging a portion of the recycle mother liquor from the system to prevent the accumulation of undesirable impurities, such as silica, sulfate ion, and particularly organic carbon impurities which build up after a number of recycles and can cause undesirable changes in crystal shape and quality. This is accomplished by monitoring the impurities level in the recycle mother liquor so that it does not exceed an organic carbon level of about 300 to 5,000 parts per million, preferably about 300 to 4,000 parts per million, basis sodium carbonate. When it is necessary, due to an unsatisfactory concentration of impurities in the recycled mother liquor to the higher temperature effect, purge of mother liquor from the first effect evaporator in an amount equivalent to about 1 to about 10%, preferably 3 to about 5%, of the total sodium carbonate introduced to the process is preferred to reduce the impurities level to a concentration which does not seriously affect crystal shape and quality. Desirably, the sodium carbonate precursor crystals contains 1 to 100, preferably 5 to 60 parts per million organic carbon impurity. The separated crystals of sodium carbonate monohydrate may be dried and stored for future use or converted to soda ash by calcining at a temperature sufficient to dry and dehydrate the sodium carbonate precursor crystals.

This commercial installation, capable of producing over 1,000 tons per day of soda ash, was operated for five days with the continuous addition of the cationic surface active agent to the carbonate process solution being fed to the multiple effect vacuum crystallization system. Tables VII and VIII, following, report the data obtained when the plant operations had reached equilibrium conditions.

TABLE VII.—PHYSICAL AND CHEMICAL DATA DURING HYAMINE ADDITION TEST ON PLANT SCALE

| | Monthly mean and average deviation prior to addition test [1] | Typical data during 5 days of hyamine addition |
|---|---|---|
| Hyamine addition rate (p.p.m./$Na_2CO_3$) | None | 23–26 |
| Foam index (ml.) | | |
| Evaporator feed without hyamine | [1] 26±5 | 30–41 |
| Evaporator feed with hyamine | (²) | 0–10 |
| Purge from evaporator system | 40–50 | 26–43 |
| Final soda ash product | 9±9 | 0 |
| Organic carbon impurity (p.p.m./$Na_2CO_3$) | | |
| Evaporator feed without hyamine | 295±30 | 340–450 |
| Evaporator feed with hyamine | (²) | 360–460 |
| Purge from evaporator system | 2,600±480 | 3,000–4,000 |
| Final soda ash product | 42±11 | 40–60 |

[1] Prior to hyamine addition test, normal plant operations included treatment of the clarified-filtered liquor with activated carbon adsorbent and refiltration prior to vacuum evaporation.
² Not applicable.

TABLE VIII.—TYPICAL PHYSICAL PROPERTIES OF MONOHYDRATE CRYSTALS AND FINAL SODA ASH PRODUCT DURING HYAMINE ADDITION TEST

|  | Typical data prior to hyamine addition | Typical data after 5 days of hyamine addition |
|---|---|---|
| Loose bulk density of monohydrate crystals (g.p.l.): | | |
| Third effect crystals | 1,170 | 1,270 |
| Second effect crystals | 12,10 | 1,300 |
| First effect crystals | 960 | 1,100 |

| Monohydrate granulation (cumulative percent retained on), U.S. mesh: | 3rd effect | 2nd effect | 1st effect | 3rd effect | 2nd effect | 1st effect |
|---|---|---|---|---|---|---|
| +20 | 0.0 | 0.0 | 0.5 | 0.0 | 0.0 | 0.6 |
| +30 | 7.8 | 9.3 | 11.1 | 1.5 | 3.3 | 7.2 |
| +40 | 36.1 | 34.3 | 42.0 | 18.3 | 20.8 | 33.6 |
| +60 | 77.8 | 79.6 | 86.1 | 67.2 | 75.1 | 78.6 |
| +100 | 94.2 | 95.4 | 98.5 | 90.7 | 93.4 | 95.8 |
| +200 | 99.2 | 99.5 | 99.8 | 98.7 | 99.2 | 99.6 |
| Pan | 100.0 | 100.0 | 100.0 | 100.0 | 100.0 | 100.0 |

|  | Typical data prior to hyamine addition | Typical data after 5 days of hyamine addition |
|---|---|---|
| Loose bulk density of final soda ash product, calcined and screened (g.p.l.) | 1,040 | 1,080 |

As may be seen from the data of Table VII, the Foam Index and organic carbon content of carbonate process solution is increased when the liquor is not treated with adsorbent activated carbon; however, the addition of 25 p.p.m. of the cationic surface active agent significantly reduces the foam of the solution without an appreciable increase in the total organic carbon content in the carbonate process solution. Furthermore, the organic carbon content of the final soda ash product is not significantly increased as demonstrated by the range of typical values from 40 to 60 p.p.m. organic carbon, basis soda ash, when compared to the monthly mean of 42±11 when using the carbon treatment.

As may be seen from the data of Table VIII, the continuous addition for five days of 25 p.p.m. of the cationic surface active agent to carbonate process solution significantly reduced the quantity of plus 40 mesh monohydrate crystals formed in the multiple effect vacuum crystallizers. Prior to the addition, the range of plus 40 mesh monohydrate crystals was from 34% to 42% cumulative; whereas after five days of continuous surfactant addition, the range was from 18% to about 34% cumulative—equivalent to a reduction of about 20% to 50% of the undesirable sized monohydrate crystals. Furthermore the shape of the precursor crystals was not affected as seen from the nearly identical measurements of bulk density of the final soda ash product.

The operation of the commercial plant, described in Example 8, for a five-month period has demonstrated significant economic improvements in plant operations. By the continuous addition of the cationic surface active agent Hyamine 1622, at concentrations ranging from about 5 to 25 p.p.m., basis contained sodium carbonate, in the carbonate process solution, the amount of undesirable oversized material was reduced in the calcined soda ash product produced. Normally, the calcined soda ash is subjected to screening techniques to reduce the quantity of plus 40 mesh material contained in the final product in order to provide a produce granulation which closely matches the sand size granulation of glass sands commonly employed in the glass-making industry. That friction of calcined soda ash product removed by screening is usually dissolved and recycled to the crystallization system or employed in some manner to economically utilize the sodium carbonate value of the oversize material.

By the practice of the present invention, the quantity of oversize calcined product was favorably decreased. The monthly median value of the cumulative quantity of plus 40 mesh calcined product was 19.2% with a range of from 15.9% to 20.5% during the month. In comparison, a typical monthly medium value of 27.7% was experienced for plant operations without the use of anti-foaming agent and the range of the value was from 22.9% to 39.6% for the cumulative quantity of plus 40 mesh material contained in the calcined soda. Undesired oversize material is normally removed by screening and recycled. The beneficial decrease in the quantity of recycled product provides a practical method of increasing the productive capacity of existing manufacturing facilities. Furthermore, improved economy of operation can be obtained through the elimination, if desired, of the adsorbent treatment step which commonly employs expensive activated carbon for the reduction of troublesome organic impurities which can cause foaming during vacuum evaporation in the crystallization of sodium carbonate precursor crystals from carbonate process solutions.

It is claimed:

1. A method for preventing foaming in the preparation of sodium carbonate precursor crystals selected from the group consisting of sodium bicarbonate, sodium sesquicarbonate, anhydrous sodium carbonate and sodium carbonate monohydrate which comprises subjecting a carbonate process solution to crystallization conducted at a temperature and under crystallization conditions sufficient to form a stable crystalline phase of said precursor crystals and separating said crystals from the mother liquor said crystallization being conducted in the presence of an anti-foaming effective amount of a cationic surface active agent and the carbonate process solution contains from about 12% by weight up to substantially saturated concentrations of equivalent sodium carbonate content.

2. The process of claim 1 wherein the cationic surface active agent is present in the carbonate process solution in amounts of about 1 to 250 parts per million active material, basis sodium carbonate.

3. The process of claim 1 wherein the cationic surface active agent is present in the carbonate process solution in amounts of about 1 to 150 parts per million active material, basis sodium carbonate 4. The process of claim 1 wherein the cationic surface active agent is selected from at least one of the group consisting of organic nitrogen compounds and their salts, organic sulfonium compounds and organic phosphonium compounds.

5. The process of claim 1 wherein the cationic surface active agent is selected from organic nitrogen compounds and their salts.

6. The process of claim 5 wherein the organic nitrogen compound is selected from the group consisting of amines, amides, heterocyclic nitrogen compounds and quaternary ammonium compounds.

7. The process of claim 6 wherein the organic nitrogen compound is an amine.

8. The process of claim 6 wherein the organic nitrogen compound is a quaternary ammonium compound.

9. The process of claim 5 wherein the organic nitrogen compound has a formula weight of between 75 and 500, basis cationic radical of active material.

10. The process of claim 5 wherein the organic nitrogen compound has a formula weight of between 130 and 450, basis cationic radical of active material.

11. The process of claim 1 wherein the cationic surface active agent is a sulfonium compound.

12. The process of claim 8 wherein the quaternary is di-isobutyl phenoxy ethoxy ethyl dimethyl benzyl ammonium chloride monohydrate.

13. The process of claim 1 wherein the precursor crystals are sodium carbonate bicarbonate.

14. The process of claim 1 wherein the precursor crystals are sodium carbonate monohydrate.

15. The process of claim 1 wherein the precursor crystals are anhydrous sodium carbonate.

16. The process of claim 1 wherein the precursor crystals are sodium sesquicarbonate.

17. A method for reducing the color of a carbonate process solution which comprises adding to said solution from 1 to 500 p.p.m. of a quaternary ammonium compound, basis equivalent sodium carbonate contained in said solution and removing the color-causing bodies from said solution.

18. A method for reducing the quantity of the plus 40 mesh size particles of sodium carbonate precursor crystals selected from the group consisting of sodium bicarbonate, sodium sesquicarbonate, anhydrous sodium carbonate and sodium carbonate monohydrate which comprises adding to a carbonate process solution from about 1 to 250 parts per million of a cationic surface active agent, subjecting said solution to a crystallization at a temperature and under crystallization conditions sufficient to form a stable crystal phase of said precursor crystals and separating said crystals from the mother liquor, said crystals being characterized by a particle granulation having a major portion thereof passing through a 40 U.S. mesh screen.

19. The process of claim 18 wherein the cationic surface active agent is an organic nitrogen compound selected from the group consisting of amines and their salts and quaternary ammonium compounds.

20. The process of claim 1 wherein the carbonate process solution prior to being subjected to crystallization is not treated with an adsorbent.

References Cited

UNITED STATES PATENTS

| | | | |
|---|---|---|---|
| 2,642,335 | 6/1953 | May et al. | 23—300 |
| 2,642,342 | 6/1953 | Vahl | 23—300 |
| 2,720,446 | 10/1955 | Whetstone et al. | 23—300 |
| 2,954,282 | 9/1960 | Bauer et al. | 23—300 |
| 3,037,849 | 6/1962 | Frint et al. | 23—300 |
| 3,082,060 | 3/1963 | Snyder et al. | 23—300 |
| 3,084,026 | 4/1963 | Frint et al. | 23—302 |
| 3,281,206 | 10/1966 | Van Damme-Van Wheele | 23—300 |
| 3,442,628 | 5/1969 | Saunders et al. | 23—300 |

NORMAN YUDKOFF, Primary Examiner

R. T. FOSTER, Assistant Examiner

U.S. Cl. X.R.

23—302; 252—321; 423—421